(12) United States Patent
Shim et al.

(10) Patent No.: US 7,866,870 B2
(45) Date of Patent: Jan. 11, 2011

(54) BACKLIGHT ASSEMBLY

(75) Inventors: Sung-Kyu Shim, Seoul (KR); Seung-In Baek, Seoul (KR); Hyoung-Joo Kim, Uiwang-si (KR); Jae-Jong Kwon, Suwon-si (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 12/243,629

(22) Filed: Oct. 1, 2008

(65) Prior Publication Data
US 2009/0180297 A1 Jul. 16, 2009

(30) Foreign Application Priority Data
Jan. 11, 2008 (KR) .................... 10-2008-0003551

(51) Int. Cl.
*F21V 7/04* (2006.01)
(52) U.S. Cl. .................. 362/620; 362/625; 362/615
(58) Field of Classification Search .............. 362/600, 362/615, 617–620, 623–626, 628, 26, 29, 362/30
See application file for complete search history.

(56) References Cited

U.S. PATENT DOCUMENTS

| | | | | |
|---|---|---|---|---|
| 5,575,549 | A * | 11/1996 | Ishikawa et al. | 362/625 |
| 6,074,069 | A * | 6/2000 | Chao-Ching et al. | 362/26 |
| 7,104,679 | B2 * | 9/2006 | Shin et al. | 362/626 |
| 7,401,962 | B2 * | 7/2008 | Yamashita et al. | 362/606 |
| 2004/0071436 | A1 * | 4/2004 | Kwon | 385/146 |
| 2004/0246697 | A1 * | 12/2004 | Yamashita et al. | 362/31 |
| 2005/0117370 | A1 * | 6/2005 | Kawashima et al. | 362/615 |
| 2005/0243575 | A1 * | 11/2005 | Kunimochi | 362/606 |
| 2005/0248960 | A1 * | 11/2005 | Yamashita et al. | 362/611 |
| 2006/0044832 | A1 * | 3/2006 | Feng et al. | 362/615 |
| 2007/0217227 | A1 * | 9/2007 | Watanabe et al. | 362/615 |

FOREIGN PATENT DOCUMENTS

| | | |
|---|---|---|
| JP | 09-101521 | 4/1997 |
| JP | 2007-115451 | 5/2007 |
| KR | 1020010001633 A | 1/2001 |

* cited by examiner

*Primary Examiner*—Ismael Negron
*Assistant Examiner*—Julie A Shallenberger
(74) *Attorney, Agent, or Firm*—Cantor Colburn LLP

(57) ABSTRACT

A backlight assembly which can reduce manufacturing costs and enhance display quality of a liquid crystal display ("LCD"). The backlight assembly includes: a light source emitting light; and a light guide plate ("LGP") including an incident surface on which light emitted from the light source is incident, a top surface which adjoins the incident surface, and a bottom surface which adjoins the incident surface, faces the top surface, and includes a plurality of lower prisms separated from one another and flat portions interposed between the lower prisms, wherein each of the lower prisms includes a first surface and a second surface which are adjacent to each other, the first surface including a plurality of oblique planes having different positive slopes, the second surface having a negative slope, and where the slope forms an angle with a line normal to the incident surface.

12 Claims, 11 Drawing Sheets

BACKLIGHT ASSEMBLY

This application claims priority to Korean Patent Application No. 10-2008-0003551, filed on Jan. 11, 2008, and all the benefits accruing therefrom under 35 U.S.C. §119, the contents of which in its entirety are herein incorporated by reference.

BACKGROUND OF THE INVENTION

1. Field of the Invention

This disclosure relates to a backlight assembly, and more particularly, to a backlight assembly which can reduce manufacturing costs and enhance display quality of a liquid crystal display ("LCD").

2. Description of the Related Art

A commercially available LCD includes a pair of display panels having electric field-generating electrodes, such as pixel electrodes and common electrodes, and a liquid crystal layer interposed between the display panels. In an LCD, voltages are applied to electric field-generating electrodes to generate an electric field. Accordingly, the alignment of liquid crystal molecules of a liquid crystal layer is controlled by the electric field, thereby controlling the transmittance of polarized light. As a result, an image can be displayed on the LCD.

Since an LCD includes non-self-luminous elements, it requires a backlight assembly for providing light to a liquid crystal panel.

A commercially available backlight assembly includes a light source which emits light, a light guide plate ("LGP") which guides the light from the light source toward a liquid crystal panel, one or more optical sheets which enhance the luminance and uniformity of the light output from the LGP to the liquid crystal panel, and a reflective sheet which is disposed under the LGP.

When a plurality of optical sheets, such as a diffusion sheet, a prism sheet or a protective sheet are used in a backlight assembly, the manufacturing cost can be increased, and the thickness of a product LCD increased as well. Therefore, what is needed is a backlight assembly having a reduced number of optical sheets that can enhance the display quality of an LCD.

BRIEF SUMMARY OF THE INVENTION

The above described and other drawbacks are alleviated by a backlight assembly which can reduce manufacturing costs and enhance display quality of a liquid crystal display ("LCD").

However, aspects of the disclosed embodiments are not restricted to those set forth herein. The above and other aspects will become more apparent to one of ordinary skill in the art to which the disclosure pertains by reference to the detailed description given below.

Described here is a backlight assembly including: a light source emitting light; and a light guide plate ("LGP"), the light guide plate including an incident surface on which light emitted from the light source is incident, a top surface which adjoins the incident surface, and a bottom surface which adjoins the incident surface, faces the top surface, and includes a plurality of lower prisms separated from one another by a flat portion interposed between each pair of lower prisms, wherein each lower prism includes a first surface and a second surface adjoining the first surface, wherein the first surface includes a plurality of oblique planes each having a different positive slope, wherein the second surface has a negative slope, and wherein the slope is defined as an angle formed by a surface and a line normal to the incident surface.

According to another aspect, there is provided a backlight assembly including: a light source emitting light; and a light guide plate, the light guide plate including an incident surface on which light emitted from the light source is incident, a top surface which adjoins the incident surface, and a bottom surface which adjoins the incident surface and faces the top surface, wherein the bottom surface includes a plurality of lower prisms separated from one another by a flat portion interposed between each pair of lower prisms, and wherein each lower prism includes a first surface and a second surface adjoining the first surface, wherein a line connecting both ends of the first surface has a positive slope, wherein the second surface has a negative slope, and wherein an absolute value of the slope of the second surface is different from the slope of the line connecting both ends of the first surface, and the slope forms an angle with a line normal to the incident surface.

Also described is a method of manufacturing a backlight assembly, the method including: disposing a light source emitting light; and disposing a light guide plate ("LGP"), the light guide plate including an incident surface on which light emitted from the light source is incident, a top surface which adjoins the incident surface, and a bottom surface which adjoins the incident surface, faces the top surface, and includes a plurality of lower prisms separated from one another by a flat portion interposed between each pair of lower prisms, and wherein each lower prism includes a first surface and a second surface adjoining the first surface, wherein the first surface includes a plurality of oblique planes each having a different positive slope, wherein the second surface has a negative slope, wherein the slope is defined as an angle formed by a surface and a line normal to the incident surface.

Also described is a method of manufacturing a backlight assembly, the method including: disposing a light source emitting light; and disposing a light guide plate, the light guide plate including an incident surface on which light emitted from the light source is incident, a top surface which adjoins the incident surface, and a bottom surface which adjoins the incident surface and faces the top surface, wherein the bottom surface includes a plurality of lower prisms separated from one another by a flat portion interposed between each pair of lower prisms, and wherein each lower prism includes a first surface and a second surface adjoining the first surface, wherein a line connecting both ends of the first surface has a positive slope, wherein the second surface has a negative slope, and wherein an absolute value of the slope of the second surface is different from the slope of the line connecting both ends of the first surface, and the slope forms an angle with a line normal to the incident surface.

These and other features, aspects, and advantages of the disclosed embodiments will become better understood with reference to the following description and appended claims.

BRIEF DESCRIPTION OF THE DRAWINGS

The above and other aspects and features of the disclosed subject matter are particularly pointed out and distinctly claimed in the claims at the conclusion of the specification. The foregoing and other objects, features and advantages of the disclosed embodiments are apparent from the following detailed description taken in conjunction with the accompanying drawings, in which:

DETAILED DESCRIPTION OF THE INVENTION

Figure 1:
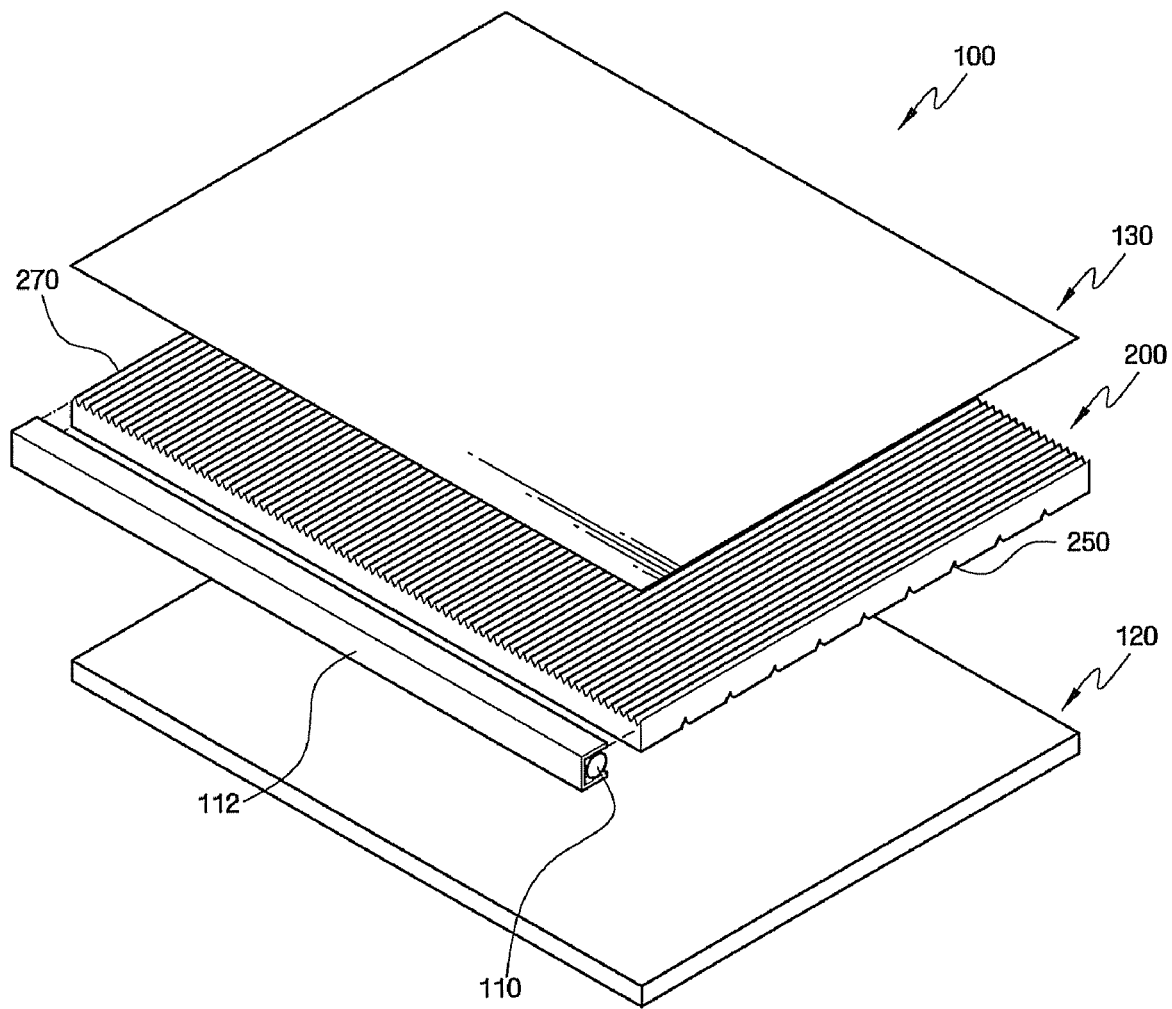
FIG. 1 is an exploded perspective view of a backlight assembly including a first light guide plate according to an exemplary embodiment.

Advantages and features and methods of this disclosure can be understood more readily by reference to the following detailed description of exemplary embodiments and the accompanying drawings. While this disclosure describes exemplary embodiments, it will be understood by those skilled in the art that various changes can be made and equivalents can be substituted for elements thereof without departing from the scope of this disclosure. The disclosed embodiments can have many different forms and should not be construed as being limited to the embodiments set forth herein. Rather, these embodiments are provided so that this disclosure will be thorough and complete and will fully convey the concept of the disclosure to those skilled in the art, and will only be defined by the appended claims. Thus many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

Like reference numerals refer to like elements throughout the specification. As used herein, the term "and/or" includes any and all combinations of one or more of the associated listed items.

It will be understood that, although the terms first, second, third, etc., can be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
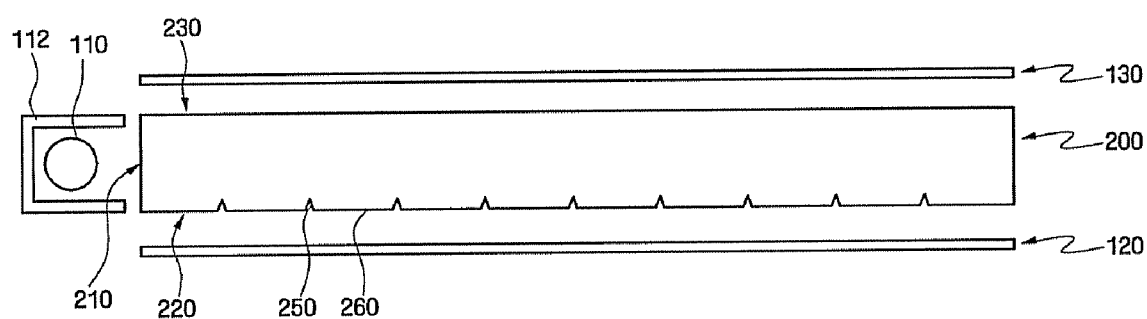
FIG. 2 is an assembled cross-sectional view of the backlight assembly shown in FIG. 1.
Figure 3:
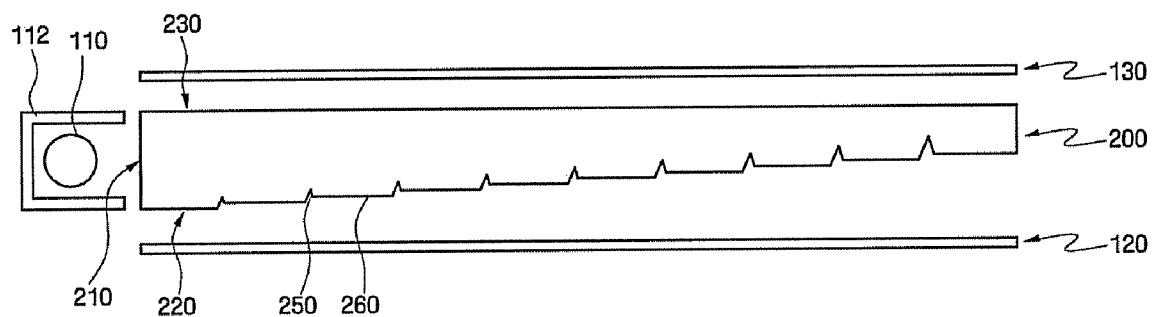
FIG. 3 is an assembled cross-sectional view of the backlight assembly including a second light guide plate ("LGP") which is different from the LGP shown in FIGS. 1 and 2.

Hereinafter, a backlight assembly according to an exemplary embodiment will be described with reference to FIGS. 1 through 3. FIG. 1 is an exploded perspective view of a backlight assembly 100 according to an exemplary embodiment. FIG. 2 is an assembled cross-sectional view of the backlight assembly 100 shown in FIG. 1. FIG. 3 is an assembled cross-sectional view of the backlight assembly 100 including a light guide plate ("LGP") which is different from an LGP 200 shown in FIGS. 1 and 2.

Referring to FIGS. 1 through 3, the backlight assembly 100 includes a light source 110 which emits light, a light source cover 112 which protects the light source 110, the LGP 200 which guides the light emitted from the light source 110, a reflective sheet 120 which is disposed under the LGP 200, and one or more optical sheets 130 which are disposed on the LGP 200.

The light source 110 is disposed on a side surface of the LGP 200. When powered by an external source, the light source 110 emits light. The light source 110 can be a light emitting diode, or can be a plurality of light-emitting diodes ("LEDs"), which are point sources of light and arranged in a line. Exemplary light sources 110 include a cold cathode fluorescent lamp ("CCFL"), an external electrode fluorescent lamp ("EEFL") having electrodes formed on outer surfaces of both ends thereof, or the like, or a combination comprising at least one of the foregoing light sources. The shape of the light source is not limited. Exemplary shapes include a long cylindrical shape, a short cylindrical shape, a spherical shape, or the like, or a combination comprising at least one of the foregoing shapes.

The light source cover 112 surrounds three surfaces of the light source 110 to protect the light source 110. The light source cover 112 protects the light source 110 and reflects light emitted from the light source 110 toward the LGP 200, thereby enhancing light-use efficiency.

The LGP 200 guides light emitted from the light source 110. The LGP 200 can comprise a transparent material to prevent light loss. Exemplary materials for the light guide plate 200 include polyolefins such as polyethylene, polypropylene; polyamides such as Nylon 4,6, Nylon 6, Nylon 6,6, Nylon 6,10, Nylon 6,12; polyesters such as polyethelene terephthalate ("PET"), polybutylene terephthalate ("PBT"), poly(1,4-cyclohexane-dimethanol-1,4-cyclohexanedicarboxylate) ("PCCD"), poly(trimethylene terephthalate)

("PTT"), poly(cyclohexanedimethanol-co-ethylene terephthalate) ("PETG"), poly(ethylene naphthalate) ("PEN"), poly (butylene naphthalate) ("PBN"); polyimides, polyacetals, polyacrylics, polycarbonates ("PC"), polystyrenes, polyamideimides, polyarylates, polyacrylates, polyurethanes, polyarylsulfones, polyethersulfones, polysulfones, polyetherimides, polyarylene ethers, or the like, or combinations comprising at least one of the foregoing polymers, or copolymers of at least one of the foregoing polymers. In an embodiment, the polymer can have domains having a maximum dimension of less than 3000 Angstroms. In an embodiment, the LGP 200 can comprise polymethyl methacrylate or polycarbonate, or the like, or combinations comprising at least one of the foregoing polymers.

The LGP 200 includes an incident surface 210 upon which light emitted from the light source 110 is incident, a top surface 230 which adjoins the incident surface 230, and a bottom surface 220 which adjoins the incident surface 210 and faces the top surface 230. As shown in FIGS. 1 and 2, the LGP 200 can be a flat plate having a uniform thickness. Alternatively, the LGP 200 can be shaped like a wedge having a thickness which is inversely proportional to a distance from the incident surface 210. If the LGP 200 is wedge-shaped, even when the light source 110 is disposed on a side surface of the LGP 200, light emitted from the light source 110 can easily reach a region of the bottom surface 220 of the LGP 200 which is farthest from the light source 110.

An upper prism 270 can be disposed on the top surface 230 of the LGP 200. An exemplary method of disposing a prism on a surface is embossing. A plurality of upper prisms 270 can be connected to each other on the top surface 230 and can be in the shape of stripes which are perpendicular to the incident surface 210.

As shown in the drawings, a cross section of each of an upper prism 270, which is perpendicular to a lengthwise direction of an upper prism 270, can be triangular. Here, the upper prism 270 can have a vertex angle of about 70 degrees to about 179 degrees, specifically about 80 to about 150 degrees, more specifically about 60 degrees to about 140 degrees. Specifically, the upper prism 270 can have a vertex angle of about 110 degrees. In addition, a pitch between a plurality of upper prisms 270 can be about 1 μm to about 500 μm, specifically about 50 μm to 150 μm, more specifically 70 μm to 125 μm.

Alternatively, a top end of the upper prism 270, that is, an edge where two inclined surfaces meet, can be refracted. Alternatively, the upper prism 270 can be shaped like a curved surface.

A lower prism 250 and a flat portion 260 can be disposed on the bottom surface 220 of the LGP 200. Specifically, the lower prism 250 can be engraved on the bottom surface 220. The lower prism 250 can be separated from another lower prism and can be shaped like a stripe which is parallel to the incident surface 210. The lower prism 250 can be disposed parallel to the lengthwise direction of the light source 110. Since the upper prism 270 can be disposed perpendicular to the incident surface 210, it can be orthogonal to the lower prism 250.

A plurality of the lower prisms 250 can be spaced at regular intervals, and their sizes can be increased as the distance from the incident surface 210 increases. Since a larger lower prism has a larger area to receive light, it can output a greater amount of light to a liquid crystal panel (not shown).

Therefore, even if smaller amounts of light reach a lower prism 250 which is located farther from the light source 110, since the light source 110 is disposed on a side surface of the LGP 200, a plurality of the lower prisms 250 can output a uniform amount of light to the liquid crystal panel. That is, luminance uniformity can be enhanced.

Specifically, the size of the lower prism 250 can vary according to a relationship defined by a polynomial function of a distance from the incident surface 210. Here, the light facing surface refers to a region of the bottom surface 220 of the LGP 200 which is farthest from the light source 110. In addition, a polynomial function can represent the relationship between the size of the lower prism 250 and the distance from the incident surface 210 to the lower prism 250. As the polynomial function which defines the size of the lower prism 250 is changed from a function of the first degree to a function of a higher degree, high luminance is observed in a middle portion of the bottom surface 220, and low luminance is observed in the vicinity of the incident surface 210 and the light facing surface. The polynomial function which defines the size of the lower prism 250 can be selected so that a luminance distribution has a Gaussian profile.

In order to enhance luminance uniformity, the gap between the lower prism 250 can also be reduced as the distance from the incident surface 210 increases.

Methods to dispose the lower prism 250 onto the bottom surface 220 include injection molding, stamping, engraving, or the like, or a combination comprising at least one of the foregoing methods. In an embodiment, the lower prism 250 can be disposed on the bottom surface 220 by stamping.

The flat portion 260 can be formed between a plurality of the lower prisms 250. As shown in the drawings, the flat portion 260 can be disposed perpendicular to the incident surface 210 so that light guided within the LGP 200 satisfies a total reflection condition. Alternatively, the flat portion 260 can slant downward at a selected angle with respect to the top surface 230 as the distance from the incident surface 210 increases. For example, the flat portion 260 can slant at an angle of about 0.01 degrees to about 10 degrees, specifically about 0.05 degrees to about 5 degrees, more specifically about 0.1 degrees to about 0.3 degrees with respect to the top surface 230.

If the flat portion 260 slants downward as described above, an incident angle of light, which is input to the flat portion 260 from the incident surface 210, is increased. Accordingly, a reflection angle is increased, which, in turn, increases a total reflectivity. In addition, after the light is reflected once, the range which the light can reach increases, thereby reducing the number of times that the light is reflected. Accordingly, light loss can be minimized, and the amount of effective light which is output from the top surface 230 can be increased. As a result, luminance can be enhanced.

As shown in FIG. 3, if the LGP 200 is shaped like a wedge having a thickness which is inversely related to a distance from the incident surface 210, a gap between the flat portion 260 and the top surface 230 can be gradually reduced as the distance from the incident surface 210 increases.

Since the LGP 200 is structured as described above, light, which is incident from the light source 110 to the LGP 200 via the incident surface 210, is totally reflected by the flat portion 260. Accordingly, an angle of reflection of the light is changed by the lower prism 250, and the light is output toward the top surface 230. The light is horizontally condensed by the upper prism 270 which is disposed on the top surface 230.

The reflective sheet 120 can be disposed under the bottom surface 220 of the LGP 200. The reflective sheet 120 reflects light, which is leaked from the LGP 200 through the bottom surface 220, back into the LGP 200. The reflective sheet 120 can be made of a material having a high light reflectivity. Exemplary materials for the reflective sheet 120 include white polyethylene terephthalate ("PET"), white polycarbonate ("PC"), titanium-dioxide-filled ABS (acrylonitrile-butadiene-styrene terpolymer), polymers which have been coated with a thin metallic layer such as silver, aluminum or gold, or the like, or a combination comprising at least one of the foregoing materials. In an embodiment, the reflective sheet comprises white polyethylene terephthalate or white polycarbonate.

The optical sheet 130 can be disposed on the LGP 200 in order to enhance the luminance of light output from the LGP 200 or to improve the exterior quality of the LGP 200.

The optical sheet 130 can include a diffusion sheet (not shown). Since the diffusion sheet has haze, it can solve problems with the exterior quality of the LGP 200, such as bright lines, dark lines, dark corner areas, or the like. The diffusion sheet can have a haze of about 1% to 99%, specifically about 20% to about 80%, more specifically about 50% to about 70%.

The optical sheet 130 can include a prism sheet (not shown). A plurality of prisms (not shown) can be connected to one another on a top surface of the prism sheet. The prisms disposed on the prism sheet can be shaped like stripes which are parallel to the upper prism 270 disposed on the top surface of the LGP 200.

Alternatively, the prisms disposed on the prism sheet can be shaped like stripes which are perpendicular to the upper prism 270. Alternatively, the optical sheet can also include a prism sheet comprising a prism shaped like a stripe and parallel to the upper prism 270, or the optical sheet can include a prism sheet comprising a prism disposed on the prism sheet which is shaped like a stripe which is perpendicular to the upper prism 270.

A cross section of a prism, which is perpendicular to the lengthwise direction of the prism, can be triangular. Here, a prism can have a vertex angle of about 70 degrees to about 179 degrees, specifically about 80 to 150 degrees, more specifically about 60 degrees to about 140 degrees. Alternatively, a top end of a prism, that is, an edge where two inclined surfaces meet, can be refracted. Alternatively, a prism can have a curved shape.

The optical sheet 130 can include a protective sheet. The protective sheet can be disposed on the prism sheet to protect the prism sheet and prevent the prism sheet from being attached to the liquid crystal panel, thereby improving the reliability of the exterior quality. The protective sheet can have a haze of about 20% to about 99%, specifically about 50% to about 95%, more specifically about 70% to about 90%.

According to an exemplary embodiment, a plurality of optical sheets can be used in the backlight assembly 100. According to an exemplary embodiment, since the formation of a dark area in the LGP 200, in particular, in the middle of a viewing angle of the LGP 200 can be prevented, as will be described later, the exterior of the LGP 200 can be improved.

Therefore, a diffusion sheet, a prism sheet and a protective sheet can be disposed on the LGP 200 as the optical sheets 130. Alternatively, a diffusion sheet and a prism sheet, or only a prism sheet, can be disposed on the LGP 200 as the optical sheet 130. If a small number of optical sheets are used, the display quality of an LCD can be enhanced while manufacturing costs are reduced.

Figure 4:
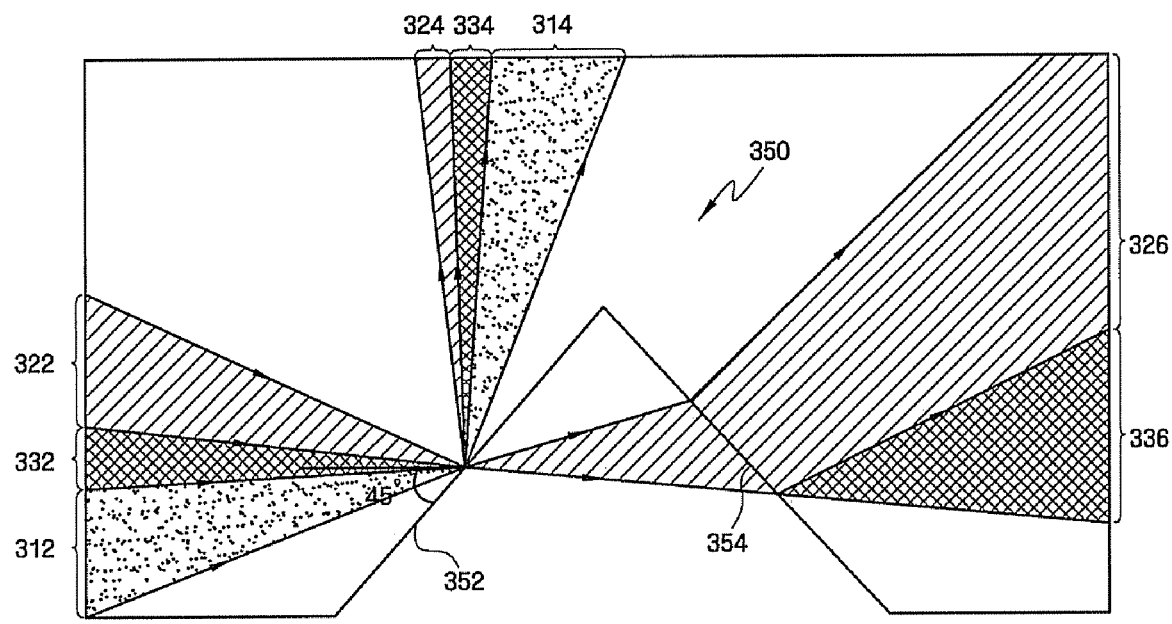
FIG. 4 shows paths of light in a lower prism according to a comparative example.

Hereinafter, a lower prism 350 of an LGP 200 included in a backlight assembly 100 according to a comparative example will be described with reference to FIGS. 1 through 4. FIG. 4 shows paths of light in the lower prism 350 according to the comparative example.

Referring to FIG. 4, the lower prism 350 according to the comparative example includes a first surface 352 and a second surface 354 which adjoin each other, and a cross section of the lower prism 350 is a horizontally symmetrical triangle.

The lower prism 350 reflects light from the light source 110 toward the liquid crystal panel. In the lower prism 350, according to the comparative example, a dark area is formed in the LGP 200, in particular, in the middle of the viewing angle of the LGP 200, which will now be described in detail.

Light, which is incident to a first region 312 of the lower prism 350, is totally reflected to a second region 314. A portion of light, which is incident to a third region 322 of the lower prism 350, is reflected to a fourth region 324, and the remaining portion of the light is refracted to a fifth region 326. Here, no light is incident to a sixth region 332, where an interior angle formed between each path of light and the first surface 352 of the lower prism 350 is about 45 degrees, for the following reason.

The light refracted to the fifth region 326 can be directly incident on a subsequent lower prism, can be reflected by the top surface 230, or can be reflected by the bottom surface 220 of the LGP 200, and then be incident on the subsequent lower prism.

The lower prism 350 can be disposed on the LGP 200, and a refractive index of a material which forms the LGP 200 is greater than that of air. Therefore, according to Snell's law, light is bent toward the LGP 200 and thus is refracted as shown in FIG. 4.

Consequently, no light exists in a seventh region 336 where an interior angle formed between each path of light and a first surface of the subsequent lower prism is about 45 degrees. That is, no light is incident on a region where an interior angle formed between each path of light and the subsequent lower prism is about 45 degrees.

In the case of a lower prism 350 which is located close to the incident surface 210, no light is incident on the sixth region 332, where the interior angle formed between each path of light and the first surface 352 of the lower prism 350 is about 45 degrees, for the following reason.

The light source 110 can be disposed in the middle of a side surface of the LGP 200, and the lower prism 350 can be disposed on the bottom surface 220 of the LGP 200. Therefore, light, which proceeds straight from the light source 110 in a direction normal to the incident surface 210, fails to be incident on a lower prism 350 which is located close to the incident surface 210, and thus goes over the lower prism 350.

That is, only light which has a direction which slants toward the bottom surface 220 with respect to the normal to the incident surface 210 and proceeds straight from the light source 110 toward the bottom surface 220 can be incident on the lower prism 350 which is located close to the incident surface 210. Consequently, no light is incident on the sixth region 332 where a slope of each path of light, with respect to the first surface 352 of the prism 350, is about 45 degrees.

As described above, no light is incident on the sixth region 332 where the slope of each path of light with respect to the first surface 352 of the lower prism 350 is about 45 degrees. Therefore, since no light is incident on and thus reflected by the sixth region 332, no light exists in an eighth region 334 which has a slope of about 90 degrees with respect to the normal to the incident surface 210. As a result, a dark area can be disposed in the LGP 200 in the middle of the viewing angle of the LGP 200.

Figure 5:
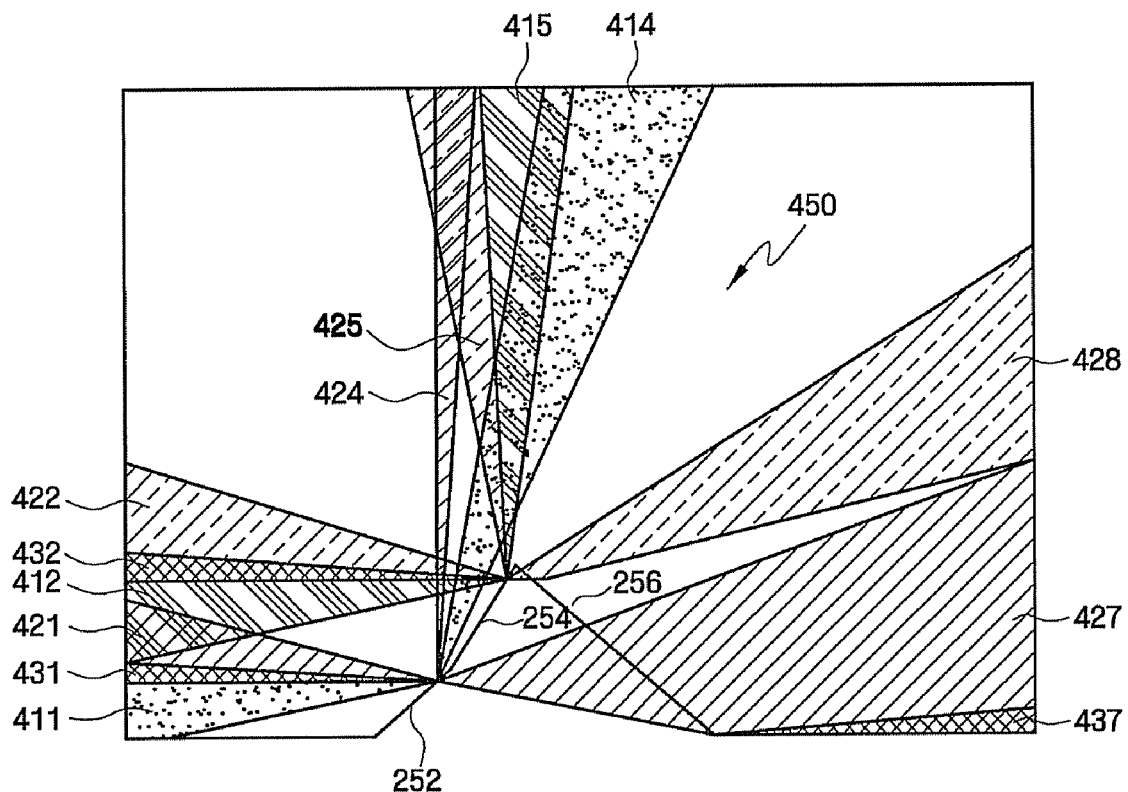
FIG. 5 shows paths of light in a lower prism of a first LGP according to a first exemplary embodiment.

Hereinafter, a lower prism 450 of an LGP 200 included in a backlight assembly 100 according to a first exemplary embodiment will be described with reference to FIGS. 1 through 3 and 5. FIG. 5 shows paths of light in the lower prism 450 of the LGP 200 according to the first exemplary embodiment.

Referring to FIG. 5, the lower prism 450, according to the first exemplary embodiment, includes a first surface comprising a plurality of oblique planes having different positive slopes, and a second surface 256, comprising a negative slope. In this case, the slope refers to an angle formed between a normal to the incident surface 210 and a surface or a line. For simplicity, a case where the first surface comprises a first and a second oblique plane 252 and 254, respectively, having different positive slopes, will be described.

Light, which is incident on a first region 411 of the first oblique plane 252, is totally reflected to a second region 414. A portion of light, which is incident on a third region 421 of the first oblique plane 252, is reflected on a fourth region 424, and the remaining portion of the light is refracted on a fifth region 427. Here, no light is incident on a sixth region 431, where an interior angle formed between each path of light and the first oblique plane 252 is about 45 degrees, for the reason described above in the comparative example. Therefore, there exists no light which is reflected by the first oblique plane 252 and is output at an angle of about 90 degrees with respect to the normal to the incident surface 210.

Light, which is incident on a seventh region 412 of the second oblique plane 254, is totally reflected to an eighth region 415. A portion of the light, which is incident on a ninth region 422 of the second oblique plane 254, is reflected to a tenth region 425, and the remaining portion of the light is refracted to an eleventh region 428. Here, no light is incident on a twelfth region 432, where an interior angle formed between each path of light and the second oblique plane 254 is about 45 degrees, for the reason described above in the comparative example. Therefore, there exists no light which is reflected by the second oblique plane 254 and is output at an angle of about 90 degrees with respect to the normal to the incident surface 210.

Since the first and second oblique planes 252 and 254 have different slopes, light is reflected by the first and second oblique planes 252 and 254 at different angles according to the law of reflection. Thus, if the slopes of the first and second oblique planes 252 and 254 are selected to be different, a dark region from the first or second oblique plane 252 or 254 as described above can be filled with light.

In addition, no light is incident on a thirteenth region 437, where an interior angle formed between each path of light and a first oblique plane of a subsequent lower prism is about 45 degrees, for the reason described above in the comparative example. That is, no light is incident on a region where an interior angle formed between each path of light and the first oblique plane of the subsequent lower prism is about 45 degrees.

Since the first and second oblique planes 252 and 254 have different slopes, light is refracted by the first and second oblique planes 252 and 254 at different angles according to Snell's law. Thus, if the fifth region 427, to which light refracted by the first oblique plane 252, is refracted again by the second oblique plane 256, and the eleventh region 428, to which light refracted by the second oblique plane 254, is refracted again by the second surface 256, are expanded by selecting the slopes of the first and second oblique planes 252 and 254, a dark region from a subsequent lower prism as described above can be reduced.

As shown in FIG. 5, if the dark region, which has a slope of approximately 90 degrees with respect to the normal to the incident surface 210, is removed by selecting the slopes of the first and second oblique planes 252 and 254, respectively, a dark area can be prevented from being disposed in the LGP 200, in particular, in the middle of a viewing angle of the LGP 200. Consequently, the exterior of the LGP 200 can be improved, which, in turn, enhances the display quality of an LCD.

In the first exemplary embodiment, the first surface can comprise four or more oblique planes having different slopes. In addition, the slopes of the oblique surfaces can be increased or reduced with respect to the distance from the incident surface 210.

Figure 6:
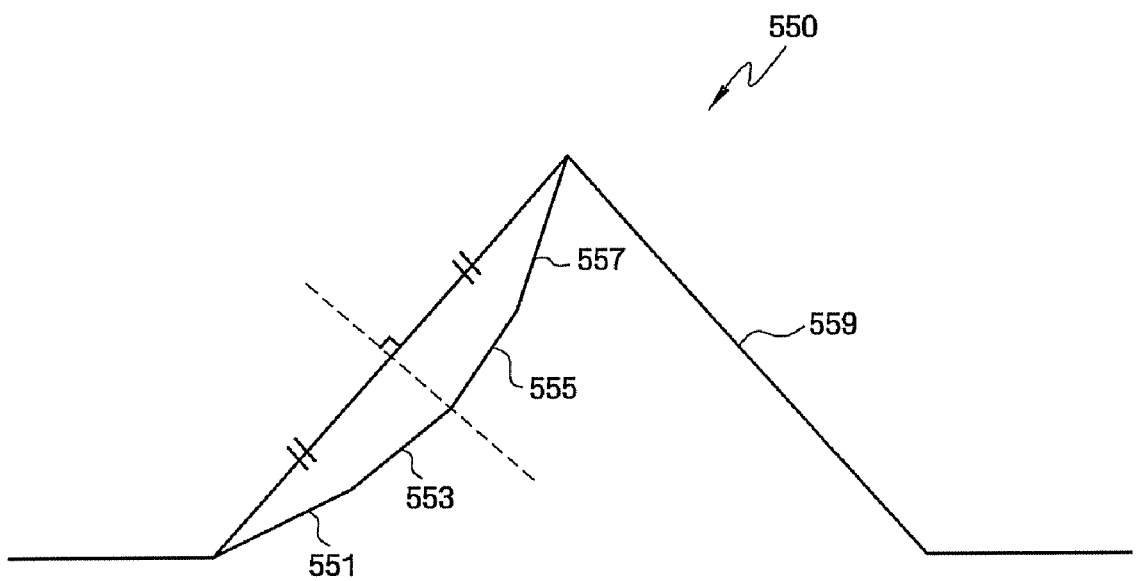
FIG. 6 shows a lower prism of a second LGP according to a second exemplary embodiment.

Hereinafter, a lower prism 550 of an LGP 200 included in a backlight assembly 100 according to a second exemplary embodiment will be described with reference to FIGS. 1 through 3 and 6. FIG. 6 shows a lower prism 550 of the LGP 200 according to the second exemplary embodiment.

Referring to FIG. 6, the lower prism 550 according to the second exemplary embodiment includes a first surface, which comprises a plurality of oblique planes having different positive slopes, and a second surface 559, which has a negative slope. The oblique planes of the first surface are symmetrical to each other with respect to a straight line which bisects a line connecting both ends of the first surface. For simplicity, a case where the first surface comprises a first through fourth oblique planes 551, 553, 555 and 557 having different positive slopes, will be described.

In the second exemplary embodiment, the first through fourth oblique planes 551, 553, 555 and 557 of the first surface are symmetrical to each other with respect to the straight line which bisects the line connecting both ends of the first surface. That is, the first and fourth oblique planes 551 and 557 are asymmetrical to each other, and the second and third oblique planes 553 and 555 are asymmetrical to each other. A detailed description of elements substantially identical to those of the first exemplary embodiment will be omitted.

Figure 7:
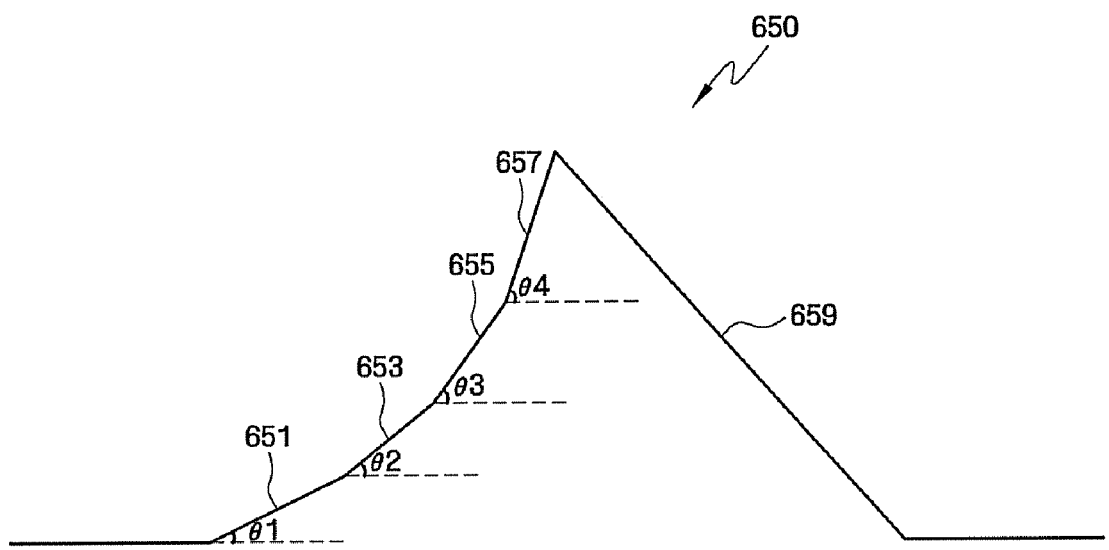
FIG. 7 shows a lower prism of an LGP according to a third exemplary embodiment.

Hereinafter, a lower prism 650 of an LGP 200 included in a backlight assembly 100 according to a third exemplary embodiment will be described with reference to FIGS. 1 through 3 and 7. FIG. 7 shows the lower prism 650 of the LGP 200 according to the third exemplary embodiment.

Referring to FIG. 7, the lower prism 650 according to the third exemplary embodiment includes a first surface, which comprises a plurality of oblique planes each having a different positive slope with respect to a normal to an incident surface 210, and a second surface 659 which has a negative slope with respect to a normal to the incident surface 210. The sum of the interior angles formed between the oblique planes of the first surface in each pair and the normal to the incident surface 210 is about 92 degrees. For simplicity, a case where the first surface comprises a first through fourth oblique planes 651, 653, 655 and 657 will be described.

In the third exemplary embodiment, the sum of interior angles formed between two symmetrical oblique planes and the normal to the incident surface 210 is about 92 degrees. That is, the sum of an interior angle $\Theta_1$ formed between a first oblique plane 651 and a normal to the incident surface 210, and an interior angle $\Theta_4$ formed between a fourth oblique plane 657 and a normal to the incident surface 210, is about 92 degrees. In addition, the sum of an interior angle $\Theta_2$ formed between a second oblique plane 653 and a normal to the incident surface 210, and an interior angle $\Theta_3$ formed between a third oblique plane 655 and a normal to the incident surface 210, is about 92 degrees. Specifically, the interior angles $\Theta_1$ through $\Theta_4$ can be about 43 degrees, about 45 degrees, about 47 degrees, and about 49 degrees, respectively. A detailed description of elements substantially identical to those of the second exemplary embodiment will be omitted.

Figure 8:
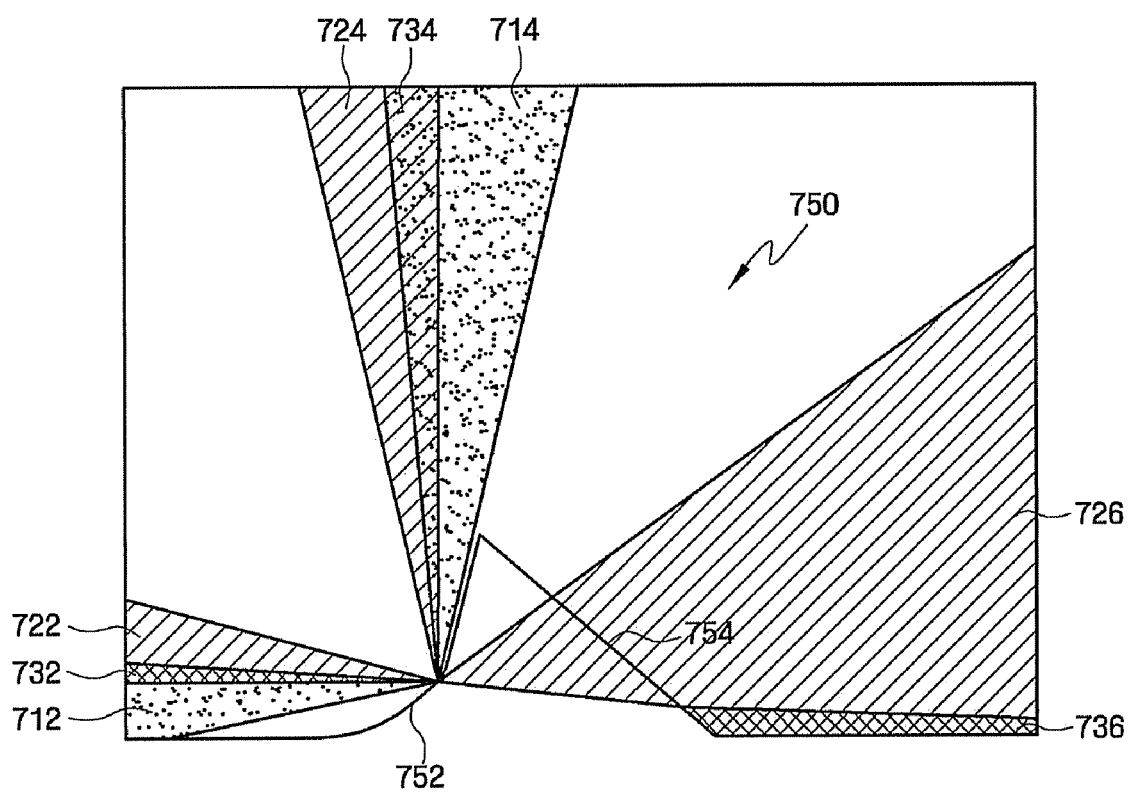
FIG. 8 shows paths of light in a lower prism of an LGP according to a fourth exemplary embodiment.

Hereinafter, a lower prism 750 of an LGP 200 included in a backlight assembly 100, according to a fourth exemplary embodiment, will be described with reference to FIGS. 1 through 3 and 8. FIG. 8 shows paths of light in a lower prism 750 of the LGP 200 according to the fourth exemplary embodiment.

Referring to FIG. 8, the lower prism 750, according to the fourth exemplary embodiment includes a curved surface formed by selecting the oblique planes of the first exemplary embodiment to have continuous slopes. That is, the lower prism 750 according to the fourth exemplary embodiment includes a first surface 752, which is a curved surface, and a second surface 754, having a negative slope. A slope of a tangent to the first surface 752 with respect to a normal to an incident surface 210 increases as the distance from the incident surface 210 increases.

Light, which is incident on a first region 712 of the lower prism 750 is totally reflected to a second region 714. A portion of light, which is incident to a third region 722 of the lower prism 750, is reflected on a fourth region 724, and the remaining portion of the light is refracted on a fifth region 726. Here, no light is incident on a sixth region 732, where an interior angle formed between each path of light and the first oblique plane 752 is about 45 degrees, for the reason described above in the comparative example.

One of ordinary skill in the art will understand that the first surface 752, which is the curved surface, can also be described as a group of oblique planes that together form a continuous slope. Thus, according to the principle described above in the first exemplary embodiment, each plane of the group of oblique planes can fill the dark region created by another oblique plane.

Meanwhile, no light exists in a seventh region 736, where an interior angle formed between each path of refracted light and a first surface of a subsequent lower prism is approximately 45 degrees, for the reason described above in the comparative example. That is, no light is incident on a region where an interior angle formed between each path of light and the first surface of the subsequent lower prism is about 45 degrees.

It can be understood that the first surface 752, which is a curved surface, comprises a group of oblique planes to form a continuous slope. Thus, according to the principle described above in the first exemplary embodiment, the region 726, to which light refracted at each point on the first surface 752 is refracted again by the second surface 754, can be expanded. Consequently, the dark region 736 created in the subsequent lower prism can be reduced.

As described above, light, which is incident on the first region 712 of the first surface 752, is totally reflected to the second region 714, and a portion of light, which is incident on the third region 722, is reflected to the fourth region 724, while the remaining portion of the light is refracted. In this case, if the second region 714 and the fourth region 724 are made to partially overlap each other in a region 734 having a slope of approximately 90 degrees with respect to the normal to the incident surface 210, the dark region created in the region 734 can be prevented. Thus, a dark area can be prevented from being formed in the LGP 200, in particular, in the middle of a viewing angle of the LGP 200. Consequently, the exterior of the LGP 200 can be improved, which, in turn, enhances the display quality of an LCD.

Figure 9:
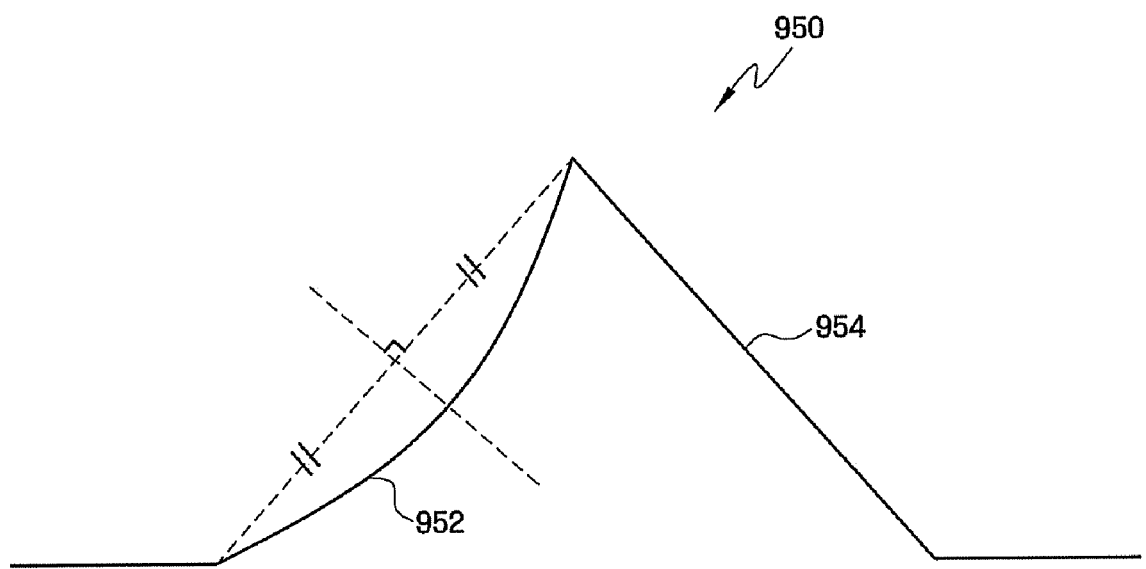
FIG. 9 shows a lower prism of an LGP according to a fourth exemplary embodiment.

Hereinafter, a lower prism 950 of an LGP 200 included in a backlight assembly 100 according to a fifth exemplary embodiment will be described with reference to FIGS. 1 through 3 and 9. FIG. 9 shows the lower prism 950 of the LGP 200 according to the fourth exemplary embodiment.

Referring to FIG. 9, the lower prism 950 according to the fifth exemplary embodiment includes a first surface 952, which is a curved surface, and a second surface 954 having a negative slope. The first surface 952 is symmetrical with respect to a straight line which bisects a line connecting both ends thereof.

As described above, in the fifth exemplary embodiment, the first surface 952 is symmetrical with respect to the straight line which bisects the line connecting both ends thereof. A detailed description of elements substantially identical to those of the fourth exemplary embodiment will be omitted.

Figure 10:
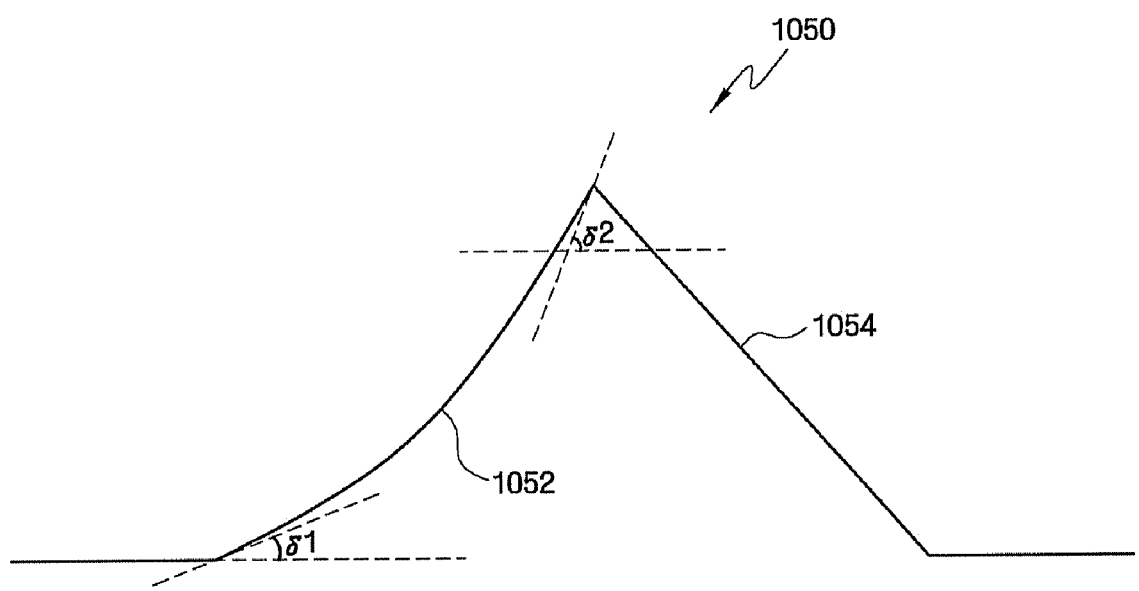
FIG. 10 shows a lower prism of an LGP according to a sixth exemplary embodiment.

Hereinafter, a lower prism 1050 of an LGP 200 included in a backlight assembly 100 according to a sixth exemplary embodiment will be described with reference to FIGS. 1 through 3 and 10. FIG. 10 shows the lower prism 1050 of the LGP 200 according to the sixth exemplary embodiment.

Referring to FIG. 10, the lower prism 1050 according to the sixth exemplary embodiment includes a first surface 1052, which is a curved surface, and a second surface 1054 having a negative slope. A slope of a tangent to the first surface 1052 with respect to a normal to an incident surface 210 is continuously increased from angle $\delta 1$ to angle $\delta 2$ as the distance from the incident surface 210 increases.

As described above, in the sixth exemplary embodiment, the slope of the tangent to the first surface 1052 with respect to the normal to the incident surface 210 is continuously increased from angle $\delta 1$ to angle $\delta 2$ as the distance from the incident surface 210 increases. Specifically, angle $\delta 1$ can be 43 degrees, and angle $\delta 2$ can be 49 degrees. A detailed description of elements substantially identical to those of the fourth exemplary embodiment will be omitted.

Figure 11:
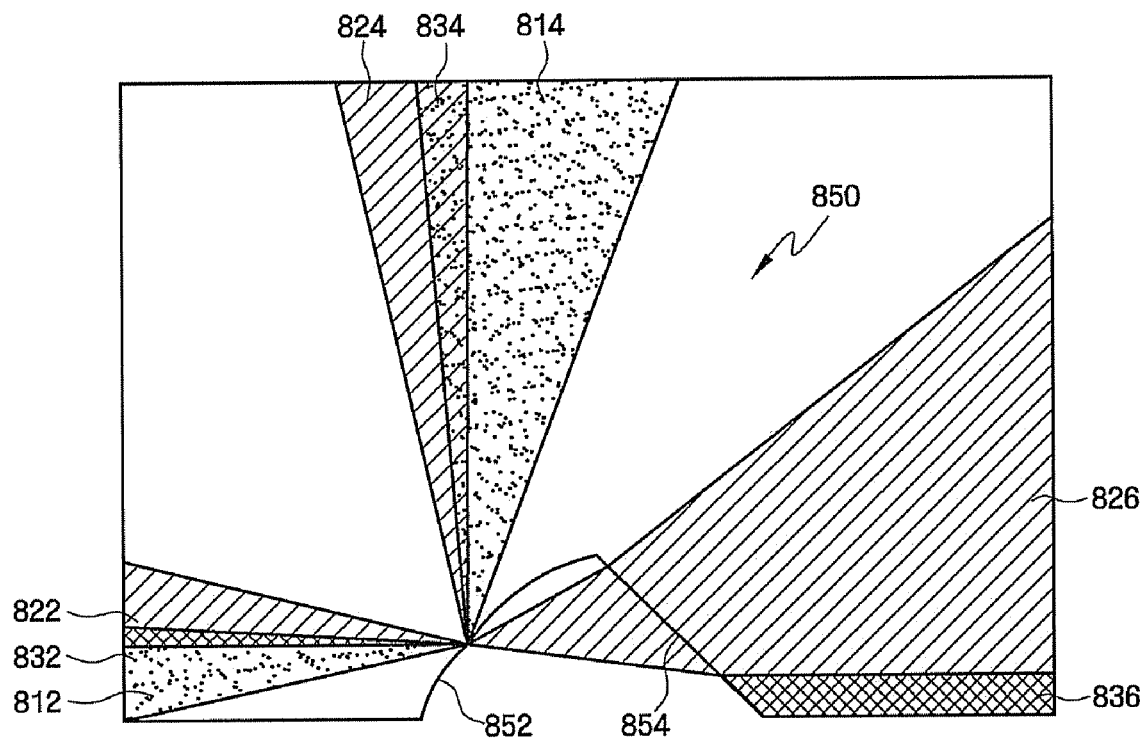
FIG. 11 shows paths of light in a lower prism of an LGP according to a seventh exemplary embodiment.

Hereinafter, a lower prism 850 of an LGP 200 included in a backlight assembly 100 according to a seventh exemplary embodiment will be described with reference to FIGS. 1 through 3 and 11. FIG. 11 shows paths of light in the lower prism 850 of the LGP 200 according to the seventh exemplary embodiment.

Referring to FIG. 11, the lower prism 850 according to the seventh exemplary embodiment includes a first surface 852, which is a curved surface, and a second surface 854 having a negative slope. A slope of a tangent to the first surface 852 with respect to a normal to an incident surface 210 is reduced as the distance from the incident surface 210 increases.

The seventh exemplary embodiment is different from the fourth exemplary embodiment in that the slope of the tangent to the first surface 852 with respect to the normal to the incident surface 210 is reduced as the distance from the incident surface 210 increases. For simplicity, a description of elements substantially identical to those of the fourth exemplary embodiment will be omitted, and differences between the fourth and seventh embodiments will be described.

According to the principle described above in the description of the fourth exemplary embodiment, each of numerous oblique planes which form the curved surface can fill the dark region created by another oblique plane. In addition, according to the principle described above in the fourth exemplary embodiment, a region 826, to which light refracted at each point on the first surface 852 is refracted again by the second surface 854, can be wide. Consequently, a dark region 836 created in a subsequent lower prism as described above can be reduced.

As described above, light, which is incident to a region 812 of the first surface 852, is totally reflected to a region 814, and a portion of light, which is incident to a region 822, is reflected to a region 824 while the remaining portion of the light is refracted. In this case, if the regions 814 and 824 are made to partially overlap each other in a region 834 having a slope of approximately 90 degrees with respect to the normal to the incident surface 210, the dark region created in the region 834 can be eliminated.

Although not shown in the drawing, in the seventh exemplary embodiment, the first surface 852 can be symmetrical with respect to a straight line which bisects a line connecting both ends thereof. In addition, a slope of a tangent to the first surface 852 with respect to the normal to the incident surface 210 can be continuously reduced from angle δ1 to angle δ2 as the distance from the incident surface 210 increases. Specifically, angle δ1 can be about 49 degrees, and angle δ2 can be about 43 degrees.

Figure 12:
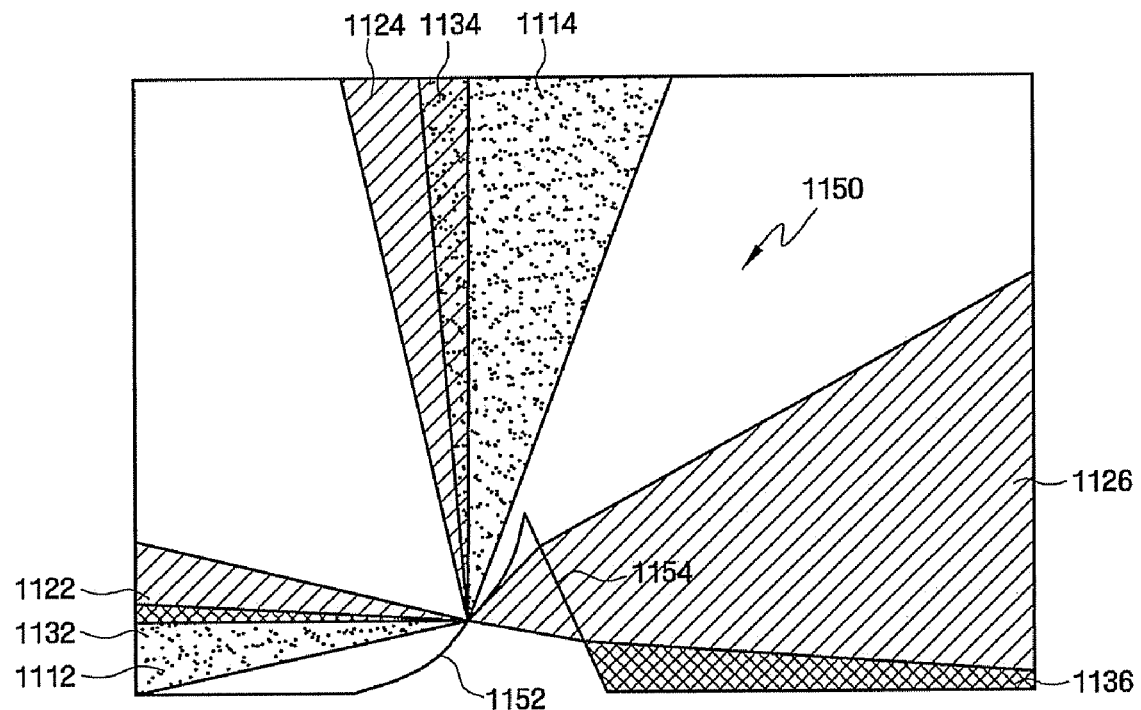
FIG. 12 shows paths of light in a lower prism of an LGP according to a seventh exemplary embodiment.
Figure 13:
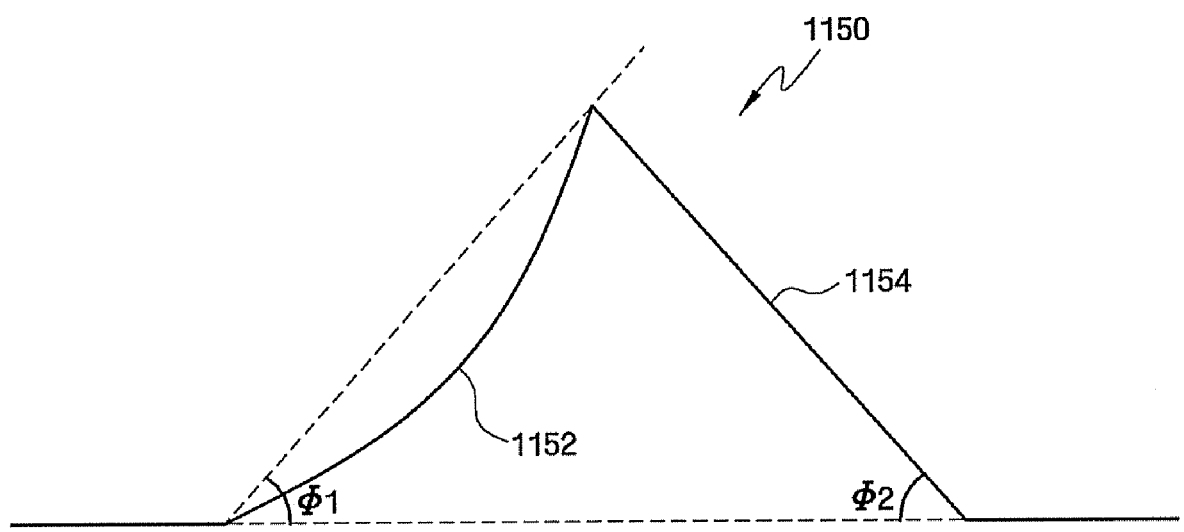
FIG. 13 shows a lower prism of FIG. 12.

Hereinafter, a lower prism 1150 of an LGP 200 included in a backlight assembly 100 according to an eighth exemplary embodiment will be described with reference to FIGS. 1 through 3, 11, and 12. FIG. 12 shows paths of light in a lower prism 1150 of the LGP 200 according to the seventh exemplary embodiment. FIG. 13 shows the lower prism 1150 of FIG. 12.

Referring to FIGS. 12 and 13, the lower prism 1150 according to the eighth exemplary embodiment includes a first surface 1152 having a positive average slope and a second surface 1154 having a negative slope. An absolute value of the average slope of the first surface 1152 is different from that of the slope of the second surface 1154. Here, the slope refers to an angle formed between a normal to the incident surface 210 and the first or second surface, respectively, and the average slope refers to an angle formed between the normal to the incident surface 210 and a straight line which connects both ends of the first surface 1152.

As shown in the drawings, the first surface 1152 can be a curved surface. Alternatively, the first surface 1152 can comprise a single oblique plane having a positive slope or a plurality of oblique planes having different positive slopes.

As described above, the absolute value of the slope of the second surface 1154 is different from that of the average slope of the first surface 1152. That is, unlike the lower prism 350 according to the comparative example, the lower prism 1150 according to the eighth exemplary embodiment is not symmetrical. The absolute value of the slope of the second surface 1154 with respect to the normal to the incident surface 210 can be higher than that of the average slope of the first surface 1152.

In particular, an interior angle δ2 formed between the second surface 1154 and the normal to the incident surface 210 can be greater than or equal to about 25 degrees, specifically greater than or equal to about 10 degrees, or more specifically greater than or equal to about 2 degrees greater than an interior angle δ1 formed between the straight line, which connects both ends of the first surface 1152, and the normal to the incident surface 210.

A case where the first surface 1152 is a curved surface will be described below. However, the disclosed embodiments are not limited thereto.

Paths of light on a first surface 1152 according to the eighth exemplary embodiment are substantially identical to those on the first surface 752 (see FIG. 8) according to the fourth exemplary embodiment. That is, although no light is incident on a region 1132 which has a slope of approximately 45 degrees with respect to the first surface 1152, each of numerous oblique planes, which form the curved first surface 1152, can fill a dark region created in another oblique plane.

A portion of light, which is incident to a region 1122, can be reflected, and the remaining portion of the light can be refracted. Here, the remaining portion of the light can be refracted to a region 1126, which is bent toward the LGP 200, for the reason described above in the comparative example.

As the absolute value of the slope of the second surface 1154 increases, light refracted by the second surface 1154 reaches closer to a bottom surface 200 of the LGP 200. This is because as the absolute value of the slope of the second surface 1154 increases, an incident angle of light, which is input to the second surface 1154, is reduced, and a refraction angle of the light is also reduced according to Snell's law. Since light, which is input to the second surface 1154 (which has an increased absolute value of the slope) is refracted at a reduced refraction angle, the light can be refracted over a wider region 1126. Consequently, a dark region 1136 in a subsequent lower prism as described above can be reduced.

As shown in the drawings, light, which is incident to a region 1112 of the first surface 1152, is totally reflected to a region 1114, and a portion of the light, which is incident to the region 1122, is reflected to a region 1124, while the remaining portion of the light is refracted. In this case, if the regions 1114 and 1124 are made to partially overlap each other in a region 1134 having a slope of approximately 90 degrees with respect to the normal to the incident surface 210, a dark region 1134 can be prevented. Thus, a dark area can be prevented from being formed in the LGP 200, in particular, in the middle of a viewing angle of the LGP 200. Consequently, the exterior of the LGP 200 can be improved, which, in turn, enhances the display quality of an LCD.

Figure 14:
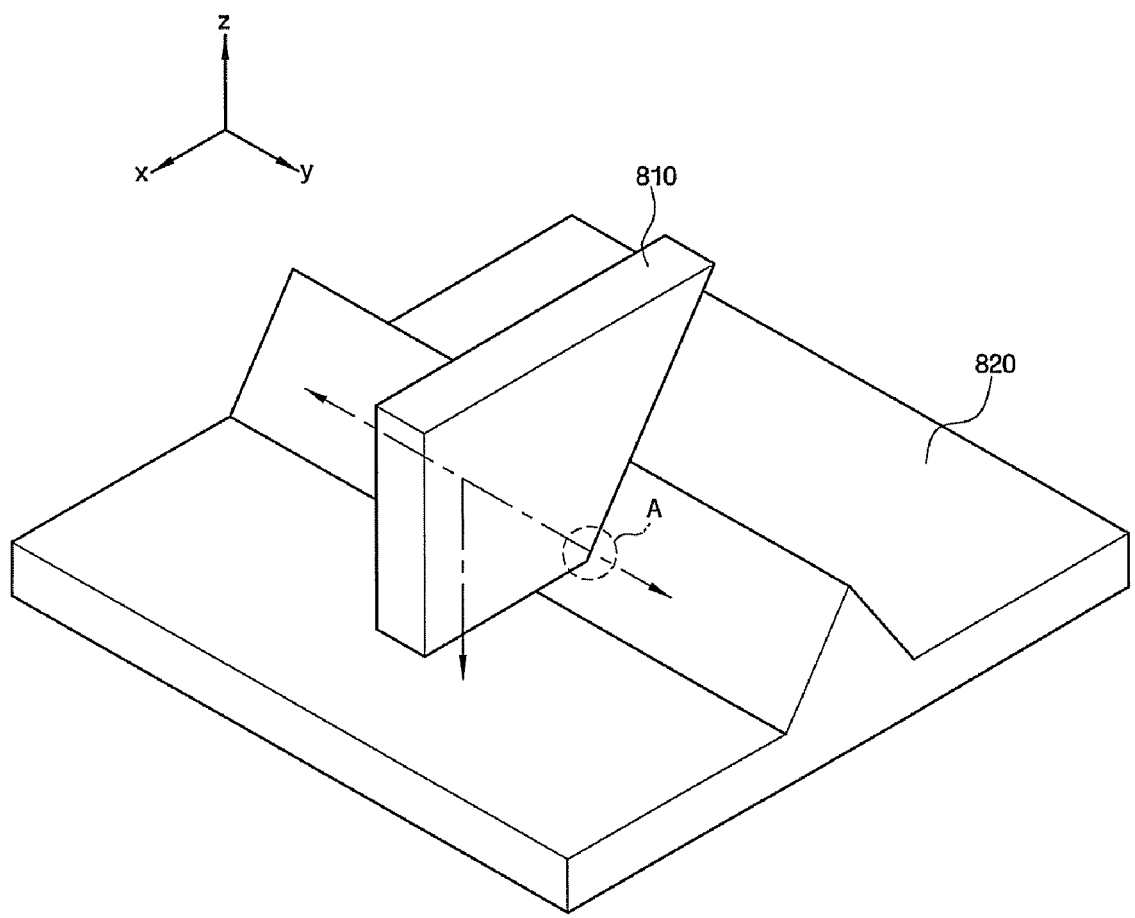
FIG. 14 is a diagram for explaining a mold core used to dispose a lower prism according to an exemplary embodiment.
Figure 15A:
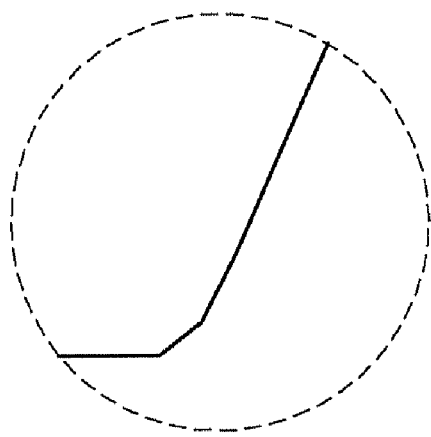
FIGS. 15A through 15C show shapes of a selected portions of FIG. 14.
Figure 15B:
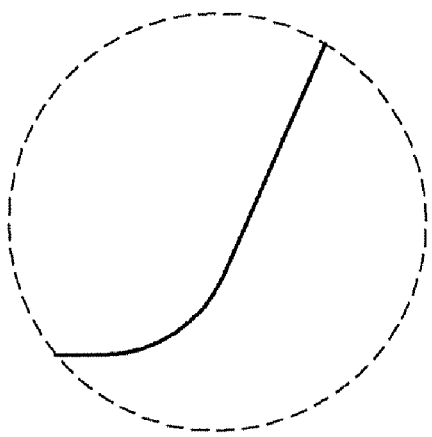
Figure 15C:
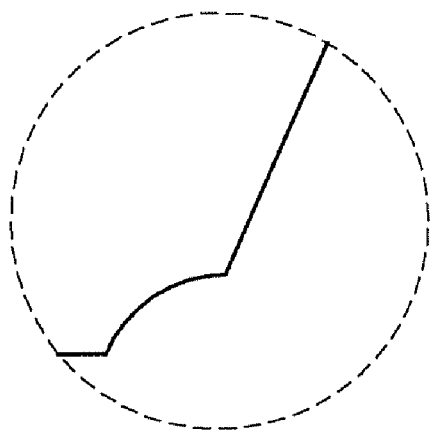
Figure 16:
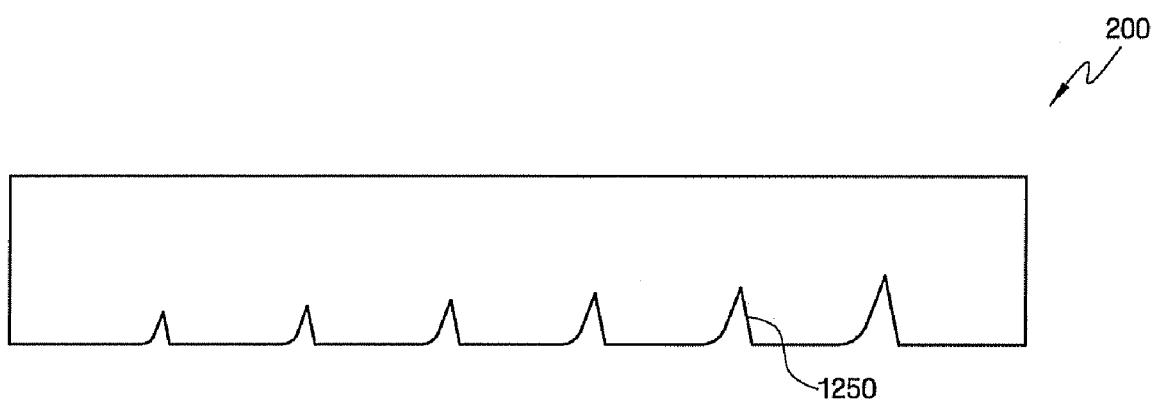
FIG. 16 shows a plurality of lower prisms according to an exemplary embodiment.
Figure 17:
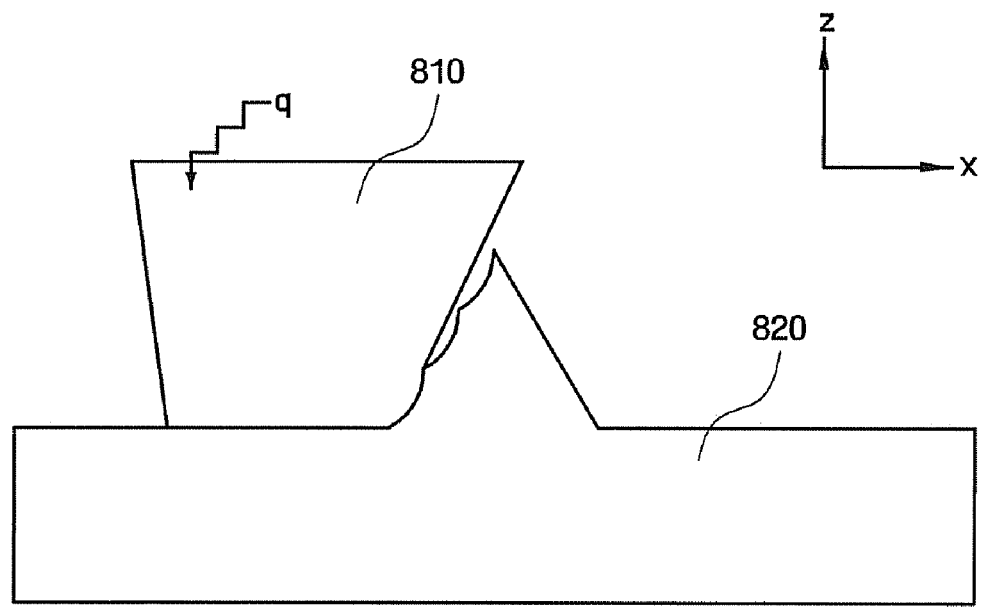
FIG. 17 is a diagram for explaining a method of disposing the lower prisms of FIG. 16.

Hereinafter, an exemplary method of disposing a lower prism according to exemplary embodiments will be described with reference to FIGS. 14 through 17. FIG. 14 is a diagram for explaining a mold core 820 used to dispose a lower prism according to exemplary embodiment. FIGS. 15A through 15C show shapes of a bite 810 of FIG. 14. FIG. 16 shows a lower prism 1250 according to an exemplary embodiment. FIG. 17 is a diagram for explaining a method of disposing the lower prism 1250 of FIG. 16.

Exemplary methods to dispose a lower prism include injection molding, engraving, cutting, or the like, or a combination comprising at least one of the foregoing methods. Specifically, referring to FIGS. 14 through 15C, a lower prism can be disposed by injection using the mold core 820. The lower prism can also be engraved on an LGP 200 by using the embossing-processed mold core 820. The mold core 820 can be formed by cutting a mold using a bite 810. Specifically, the bite 810 can be disposed perpendicular (in a z direction) to a surface of the mold core 820 (which is to be processed), and the mold core 820 can be cut by repeatedly moving the bite 810 several times in a y direction.

Each lower prism according to an exemplary embodiment can comprise a plurality of oblique plane having different slopes, or the lower prism can comprise a curved surface. Thus, the mold core 820 is disposed by using the bite 810 shaped as shown in FIGS. 15A, 15B, or 15C.

Referring to FIG. 16, the lower prism 1250 disposed on the LGP 200 can have a different size than another lower prism 1250 disposed on the LGP 200, or a lower prism can be substantially the same size as another lower prism 1250 disposed on the LGP 200. Thus, as indicated by reference character q in FIG. 17, the bite 810 can be disposed perpendicular (in the z direction) to the surface of the mold core 820 (which is to be processed), and the metal core 820 can be cut by repeatedly moving the bite 810 several times in the y direction while slightly moving the bite 810 in a direction (an x direction) parallel to the surface of the mold core 820. If a section having an oblique plane or a curved surface is continuously formed in this way, the mold core 820 having a shape similar to a desired shape can be obtained.

While this disclosure describes embodiments which have been particularly shown and described with reference to exemplary embodiments thereof, it will be understood by those of ordinary skill in the art that various changes in form and detail can be made therein without departing from the spirit and scope of the disclosed embodiments as defined by the following claims. The exemplary embodiments should be considered in a descriptive sense only and not for purposes of limitation.

What is claimed is:

1. A backlight assembly comprising:
a light source emitting light; and
a light guide plate (LGP), the light guide plate comprising an incident surface on which light emitted from the light source is incident, a top surface which adjoins the incident surface, and a bottom surface which adjoins the incident surface, faces the top surface, and comprises a plurality of lower prisms separated from one another by a flat portion interposed between each pair of lower prisms, and
wherein each lower prism comprises a first surface and a second surface adjoining one end of the first surface, wherein the first surface comprises a plurality of oblique planes each having a different positive slope, wherein the second surface has a negative slope, wherein the slope is defined as an angle formed by a surface and a line normal to the incident surface,
wherein the oblique planes are symmetrical with respect to a line which bisects a first line which connects the one end and opposite end adjoining the flat portion and defining the first surface.

2. The backlight assembly of claim 1, wherein a plurality of upper prisms are connected to one another and embossed on the top surface, and wherein the lower prisms are engraved on the bottom surface.

3. The backlight assembly of claim 2, further comprising:
a reflective sheet disposed under the light guide plate; and
a prism sheet, the prism sheet comprising a plurality of prisms disposed parallel to the upper prisms, wherein the prism sheet is disposed on the light guide plate.

4. The backlight assembly of claim 1, wherein the slopes of the oblique planes are increased or reduced as the distance from the incident surface increases.

5. The backlight assembly of claim 4, wherein a sum of an interior angles formed between two symmetrical oblique planes and the normal to the incident surface, respectively, is about 92 degrees.

6. The backlight assembly of claim 1, wherein the oblique planes have continuous slopes to form the first surface as a curved surface.

7. The backlight assembly of claim 6, wherein the curved surface is symmetrical with respect to the line which bisects the first line connecting both ends of the curved surface.

8. The backlight assembly of claim 1, wherein an absolute value of the slope of the second surface is greater than a slope of a first line which connects both ends of the first surface.

9. The backlight assembly of claim 8, wherein an interior angle formed between the second surface and a normal to the incident surface is greater than or equal to about 10 degrees greater than an interior angle formed between a first line which connects the ends of the first surface and the normal to the incident surface.

10. The backlight assembly of claim 1, wherein the light source comprises a light-emitting diode (LED).

11. The backlight assembly of claim 1, wherein the light source comprises a plurality of light-emitting diodes (LEDs) arranged in a line, and wherein the flat portions are separated from the top surface by a constant distance.

12. The backlight assembly of claim 1, wherein a distance between the flat portions and the top surface is inversely related to a distance from the incident surface, and a size of a lower prism is proportional a distance from the incident surface.

* * * * *